United States Patent Office

3,549,718
Patented Dec. 22, 1970

3,549,718
HYDROCARBON CONVERSION PROCESS
John H. Estes and George W. Eckert, Wappingers Falls, N.Y., assignors to Texaco Inc., New York, N.Y., a corporation of Delaware
No Drawing. Continuation-in-part of application Ser. No. 280,429, May 14, 1963. This application May 8, 1969, Ser. No. 823,153
Int. Cl. C07c 3/56
U.S. Cl. 260—671                               4 Claims

ABSTRACT OF THE DISCLOSURE

An alkylation catalyst composed of alumina and about 1.0 to 10.0 weight percent combined chlorine where the combined chlorine is added to the alumina by heating the alumina and trichloroacetyl chloride at a temperature of about 300 to 650° F.

CROSS REFERENCE TO RELATED APPLICATION

This application is a continuation-in-part of our co-pending aplication Ser. No. 280,429, filed May 14, 1963, now abandoned.

This invention relates to a hydrocarbon conversion process and catalyst and more particularly to a method and catalyst for the alkylation of an alkylatable hydrocarbon with an olefinic material. In accordance with the process of this invention, an alkylatable hydrocarbon and an olefin are contacted under alkylating conditions with a catalyst consisting essentially of alumina and combined chlorine wherein said combined chlorine is added to the alumina by heating the alumina in the presence of a chloroalkane or an acid chloride under anhydrous conditions.

The alkylation of hydrocarbons with olefins is a well-known process widely practiced in the petroleum industry. For example, gasoline constituents of high octane number are manufactured by the alkylation of isoparaffins, principally isobutane with olefins including propylene butylenes and pentylenes in the presence of an acidic liquid catalyst such as sulfuric acid or hydrofluoric acid. Aromatic hydrocarbons are alkylated with olefins for the manufacture of ethyl benzene, cumene and other alkyl aromatics which are used principally as intermediates in chemical manufacture. In the alkylation of aromatics, solid catalysts have usually been employed such as clay or kieselguhr impregnated with phosphoric acid or a Friedel-Crafts halide such as aluminum chloride or boron trifluoride. We have discovered that a highly active alkylation catalyst useful in the alkylation of alkane and aromatic hydrocarbons with olefins may be prepared by treating alumina with a chloroalkane or an acid chloride.

An object of our invention is to provide an improved catalyst and process for the alkylation of alkylatable hydrocarbons. An advantage of the catalyst prepared in accordance with our invention is that it is easily prepared from inexpensive raw materials. It is highly active at moderate temperatures. It is a solid which may be disposed as a fixed bed through which the reactants are passed so that there is no problem of separation of the catalyst from the reaction products. It is non-corrosive and does not form decomposition products which must be separated from the hydrocarbon alkylation products.

The catalyst for use in our process is preferably prepared from eta-alumina. Eta-alumina may be prepared by heating beta-alumina trihydrate, suitably at a temperature within the range of about 500 to 1200° F. Beta-alumina trihydrate is an article of commerce and may be produced by various methods well known in the art. The alumina is activated by treatment with a chloride activating agent under conditions effective to react at least a portion of said activating agent with at least a portion of said alumina. Chloride activating agents include chlorohydrocarbons, for example, chloroalkanes and alkyl chlorides, and organic chlorides, for example, acid chlorides. Chloride activating agents which may be used in the process of this invention include chlorohydrocarbons and acid chlorides having atomic ratios of chlorine to carbon of at least 2:1 for example, carbon tetrachloride, chloroform, methylene chloride, phosgene, and trichloroacetyl chloride. Carbon tetrachloride is a preferred activating agent since it not only produces a catalyst of high activity, but also provides the greatest amount of chlorine for a given amount of reagent, is relatively inexpensive and is easily handled. Chloroalkanes and acid chlorides having atomic ratios of chlorine to carbon less than 2:1, for example, methyl chloride, ethylene chloride, and monochloroacetyl chloride are found to be ineffective as activating agents.

In accordance with our method of activation, the alumina is contacted with a chloride activating agent containing chlorine in an amount within the range of about 3.0 to 15.0 percent by weight of the alumina to introduce within the range of about 1.0 to 10.0 weight percent chlorine. Contact is effected at a temperature of at least 300° F. and preferably within the range of about 400 to 650° F. The duration of the heating step and the rate of heating do not appear critical so long as control is maintained and uniform conditions are achieved. Although it is not necessary for the preparation of an active catalyst of satisfactory life, we have found that the stability of the catalyst may be improved by subsequent treatment in the presence of hydrogen chloride at temperature within the range of about 400 to 1000° F. The catalyst may be provided in pellet, granular, bead, or pulverulent form to facilitate its use in fixed beds, moving beds, or fluidized solid beds as is well known in the art.

Alkylatable hydrocarbons which may be alkylated with an olefinic material in accordance with this invention include aromatic hydrocarbons and paraffin hydrocarbons containing a tertiary carbon atom. Olefinic materials which may be used include low boiling mono-olefins for example, ethylene, propylene, butylene, pentylenes, and higher boiling olefins and polymers, for example, propylene and butylene polymers or copolymers. Alkylation is effected at a temperature within the range of 50 to 500° F., preferably within the range of 70 to 200° F., and at a pressure wihtin the range of atmospheric to 1500 p.s.i.g., preferably of at least 500 p.s.i.g. A liquid hourly space velocity expressed in volumes of liquid per hour per volume of catalyst within the range of 0.5 to 20.0 is employed. A mole ratio of alkylatable hydrocarbon to olefinic material of at least 2:1 and preferably at least 4:1 is maintained. Advantageously, a pressure sufficiently high to maintain liquid phase conditions is employed in the alkylation.

EXAMPLE A

An eta alumina catalyst base is prepared by heating beta alumina trihydrate for two hours at 1,000° F. A 100 cc. portion of this eta alumina catalyst base is contacted with a mixture of benzene and ethylene in a mole ratio of 5:1 respectively, a charge rate of 100 grams per hour, and at a pressure of 700 pounds per square inch. At temperatures of 200, 300 and 400° F. no ethyl benzene is found in the effluent liquid product.

EXAMPLE B

A portion of the eta alumina catalyst base of Example A is admixed with an aqueous solution of chloroplatinic acid, dried and calcined for a period of two hours at 1,050° F. forming a composite containing 0.5 weight percent platinum. A 100 cc. portion of this platinized eta alumina is contacted with 100 grams per hour of a mixture of benzene and ethylene in a mole ratio of 5:1 respectively, at contacting temperatures of 200, 300 and 400° F. and at a pressure of 700 p.s.i.g. No ethyl benzene is found in the liquid products.

EXAMPLE C

A portion of the eta alumina catalyst base of Example A is contacted with carbon tetrachloride vapor employing one part by weight of carbon tetrachloride to 10 parts of alumina. The carbon tetrachloride and alumina are heated to a temperature of 500° F. over a period of two hours and held at this temperature for an additional two hours in a closed vessel. The resulting chloride activated alumina has a chlorine content of 7.9 weight percent. A 100 cc. portion of the chloride activated alumina is contacted with 100 grams per hour of a mixture of benzene and ethylene in a mole ratio of 5:1 respectively, at a temperature of 200° F. and a pressure of 300 p.s.i.g. effecting conversion of 10.9 percent of the ethylene to ethyl benzene forming an alkylate (liquid higher boiling than benzene) containing 95.6 percent by weight ethyl benzene. A second 100 cc. portion of the chloride activated alumina is contacted with 100 grams per hour of a mixture of benzene and ethylene in a mole ratio of 5:1 at 700 p.s.i.g., and at various temperatures with the results shown in the following tabulation:

| Temperature, ° F. | Conversion of ethylene to ethyl benzene, percent | Ethyl benzene in alkylate, percent |
|---|---|---|
| 200 | 34.7 | 88.9 |
| 300 | 39.7 | 94.7 |
| 400 | 39.6 | 95.2 |
| 500 | 36.3 | 94.3 |

Another 100 cc. portion of the chlorided eta alumina is contacted with a mixture of benzene and propylene in a mole ratio of 8:1 at a pressure of 700 p.s.i.g. and various temperatures with the following results:

| Temperature, °F. | Conversion of propylene to cumene, percent | Composition of alkylate, weight percent cumene |
|---|---|---|
| 72 | 40.7 | 68.7 |
| 150 | 52.3 | 71.0 |
| 200 | 73.1 | 88.7 |
| 300 | 66.1 | 87.1 |

EXAMPLE D

A portion of the platinized eta alumina of Example B is contacted with carbon tetrachloride vapor employing one part by weight of carbon tetrachloride to 10 parts of platinized alumina employing the same procedure as Example C forming a platinized alumina composite containing 6.8 weight percent chlorine and 0.5 weight percent platinum. A 100 cc. portion of this chloride activated platinized alumina is contacted with 100 grams per hour of a mixture of benzene and ethylene in a mole ratio of 5:1 at a pressure of 700 p.s.i.g. and various temperatures with the following results:

| Temperature, ° F. | Conversion of ethylene to ethyl benzene, percent | Ethyl benzene in alkylate |
|---|---|---|
| 200 | 32.8 | 84.8 |
| 300 | 48.4 | 87.3 |
| 400 | 47.7 | 90.5 |
| 500 | 42.2 | 89.3 |

EXAMPLE E

A 100 cc. portion of a catalyst comprising 50 percent phosphoric acid on kieselguhr is contacted with 100 grams per hour of a mixture of benzene and ethylene in a mole ratio of 5:1 at 700 p.s.i.g. and at varying temperatures. At temperatures of 200, 300 and 400° F., no conversion of ethylene to ethyl benzene is observed and no ethyl benzene appears in the alkylate product. At a temperature of 500° F., 15.8 percent ethylene is converted to ethyl benzene forming an alkylate product containing 83.0 percent ethyl benzene.

EXAMPLE F

A 100 cc. portion of a silica alumina catalyst comprising 87.5 percent silica and 12.5 percent alumina is contacted with 100 grams per hour of a mixture of ethylene and benzene in a mole ratio of 5:1 at a pressure of 700 p.s.i.g. and various temperatures. At temperatures of 200, 300 and 400° F., no conversion of ethylene to ethyl benzene is observed and no ethyl benzene appears in the liquid product. At 500° F. 30.1 percent of the ethylene is converted to ethyl benzene forming an alkylate product containing 90.8 weight percent ethyl benzene.

EXAMPLE G 156 grams of an eta-alumina catalyst base was heated to 1050° F. for three hours in a stream of dry air. The eta-alumina catalyst base was thereafter heated to a temperature of 475° F. while air passed through the catalyst at the rate of 1 cubic foor per hour. 35 cc. (56 grams) of vaporized trichloroacetyl chloride was introduced into the air stream and contacted with the eta-alumina catalyst base over a period of 1½ hours. The resulting chloride activated alumina had a chlorine content of 9.8 weight percent and 169 grams of the so activated catalyst was recovered.

A 100 cc. portion (72 grams) of the chloride activated alumina was contacted with a 6:1 mole ratio mixture of benzene and ethylene at a temperature of 200° F., a nitrogen pressure of 600 p.s.i.g., a liquid hourly space velocity of 1.0 and at the rate of 70 grams per hour. The unstabilized product contained 3.0 weight percent ethylbenzene with no detectable amounts of diethylbenzene. The conversion based on ethylene was 22 weight percent. The conversion can be increased to higher levels by recovering and recycling the initial reactants.

We claim:

1. An alkylation catalyst consisting essentially of alumina and combined chlorine in an amount within the range of about 1.0 to 10.0 weight percent wherein said combined chlorine is added to said alumina by heating said alumina and trichloroacetyl chloride at a temperature within the range of about 300 to 650° F.

2. A method for the alkylation of an alkylatable hydrocarbon with an olefinic material which comprises contacting said alkylatable hydrocarbon and said olefinic material under alkylating conditions with the catalyst of claim 1.

3. A method for the alkylation of benzene with ethylene which comprises contacting benzene and ethylene at a temperature within the range of 50 to 500° F., a pressure within the range of atmospheric to 1500 p.s.i.g., a liquid hourly space velocity within the range of 0.5 to 20.0 and a mole ratio of benzene to ethylene of at least 4:1 with the catalyst of claim 1.

4. A method of preparing a catalyst consisting essentially of alumina and combined chlorine suitable for the alkylation of an alkylatable hydrocarbon with an olefinic material at a temperature within the range of 50 to 500° F. which comprises heating alumina in contact with trichloroacetyl chloride at a temperature within the range of about 300 to 650° F. until the chlorine content of the catalyst is in the range of about 1.0 to about 10.0 weight percent.

References Cited

UNITED STATES PATENTS

| 3,240,840 | 3/1966 | Goble, et al. |
| 3,242,228 | 3/1966 | Riordan et al. |
| 3,248,442 | 4/1966 | Goble et al. |

CURTIS R. DAVIS, Primary Examiner

U.S. Cl. X.R.

252—441, 442; 260—683.47